US012671592B2

(12) United States Patent
Park et al.

(10) Patent No.: US 12,671,592 B2
(45) Date of Patent: Jun. 30, 2026

(54) METHOD AND APPARATUS FOR ESTABLISHING END-TO-END SECURITY IN WIRELESS COMMUNICATION SYSTEM

(71) Applicant: Samsung Electronics Co., Ltd., Suwon-si (KR)

(72) Inventors: Junhyun Park, Suwon-si (KR); Taehyung Lim, Suwon-si (KR); Jungje Son, Suwon-si (KR); Hongjin Choi, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 587 days.

(21) Appl. No.: 18/064,522

(22) Filed: Dec. 12, 2022

(65) Prior Publication Data

US 2023/0188360 A1     Jun. 15, 2023

(30) Foreign Application Priority Data

| Dec. 14, 2021 | (KR) | .......................... | 10-2021-0179157 |
| Sep. 30, 2022 | (KR) | .......................... | 10-2022-0125622 |
| Nov. 4, 2022 | (KR) | .......................... | 10-2022-0145917 |

(51) Int. Cl.
      *H04L 9/32*          (2006.01)
      *H04W 12/08*       (2021.01)

(52) U.S. Cl.
      CPC .......... *H04L 9/3247* (2013.01); *H04L 9/3263* (2013.01); *H04W 12/08* (2013.01)

(58) Field of Classification Search
      CPC ... H04L 9/3247; H04L 9/3263; H04L 9/0838; H04L 63/0869; H04L 2209/80;
      (Continued)

(56) References Cited

U.S. PATENT DOCUMENTS

| 6,643,701 B1 * | 11/2003 | Aziz | ....................... | H04L 67/14 |
| | | | | 709/227 |
| 2018/0167974 A1 * | 6/2018 | Li | ......................... | H04L 5/0023 |

(Continued)

OTHER PUBLICATIONS

International Search Report and Written Opinion of the International Searching Authority dated, in Mar. 14, 2023, connection with International Application No. PCT/KR2022/019602, 9 pages.

(Continued)

*Primary Examiner* — Jung W Kim
*Assistant Examiner* — James P Moles

(57)                ABSTRACT

The disclosure relates to a 5G or 6G communication system for supporting a higher data transmission rate. Disclosed is a method of a first terminal in a wireless communication system including transmitting a first request message for information required for establishing security between terminals to a first entity, receiving a first response message including the information required for establishing security between terminals from the first entity in response to the first request message, generating security information for the first terminal, based on the response message, transmitting a second request message including the security information for the first terminal to a relay terminal, establishing security with the relay terminal, receiving a second response message including security information for a second terminal from the relay terminal in response to the second request message, and generating an end-to-end session key between terminals, based on the received security information for the second terminal.

16 Claims, 7 Drawing Sheets

(58) Field of Classification Search
CPC ....... H04W 12/080431; H04W 12/106; H04W 12/041; H04W 12/0471; H04W 12/069; H04W 88/04; H04W 12/08; H04W 12/0431
See application file for complete search history.

(56) References Cited

U.S. PATENT DOCUMENTS

| | | | | |
|---|---|---|---|---|
| 2023/0254692 A1* | 8/2023 | Kim | ...................... | H04W 12/61 |
| | | | | 726/6 |
| 2024/0349084 A1* | 10/2024 | Perras | ................... | H04W 36/16 |

OTHER PUBLICATIONS

LG Electronics, et al., "Procedure for secondary authentication without N3IWF," S3-213971, 3GPP TSG-SA3 Meeting #105e, e-meeting, Nov. 8-19, 2021, 5 pages.
Qualcomm Incorporated, et al., "User-plane UE-to-network relay connection procedure," S3-214438 revision of S3-214140, 3GPP TSG-SA3 Meeting #105-e, e-meeting, Nov. 8-19, 2021, 5 pages.
3GPP TS 23.304 V17.0.0 (Sep. 2021), Technical Specification, 3rd Generation Partnership Project; Technical Specification Group Services and System Aspects; Proximity based Services (ProSe) in the 5G System (5GS) (Release 17), Sep. 2021, 100 pages.
3GPP TS 33.503 V0.2.0 (Nov. 2021), Technical Specification, 3rd Generation Partnership Project; Technical Specification Group Services and System Aspects; Security Aspects of Proximity based Services (ProSe) in the 5G System (5GS) (Release 17), Nov. 2021, 32 pages.

* cited by examiner

METHOD AND APPARATUS FOR ESTABLISHING END-TO-END SECURITY IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2021-0179157, 10-2022-0125622 and 10-2022-0145917, filed on Dec. 14, 2021, Sep. 30, 2022 and Nov. 4, 2022, in the Korean Intellectual Property Office, the disclosure of which is herein incorporated by reference in its entirety.

BACKGROUND

1. Field

The disclosure relates to a wireless communication system and, more particularly, to a method of establishing security between two user equipments (UEs) corresponding to ends when the two UEs communicate via a relay in a wireless communication system.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol sack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

5G systems are considering supports for more various services as compared to the conventional 4G systems. For example, the most representative services may include a ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in constrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

In order to promote evolution from the conventional 4G LTE system to the 5G system, a 3GPP in charge of cellular mobile communication standards has named a new core network structure as a 5G core (5GC) and standardized it.

The 5GC supports the following differentiated functions compared to an evolved packet core (EPC) that is a network core for the conventional 4G.

First, a network slice function is introduced in the 5GC. As requirements of 5G, the 5GC should support various types of user equipments (UEs) and services. For example, the services include enhanced mobile broadband (eMBB), ultra-reliable low-latency communication (URLLC), and massive machine type communication (mMTC). The UEs/services have different requirements for the core network. For example, the eMBB service requires a high data rate, and the URLLC service requires high stability and low latency. A technology provided to meet such various service requirements is the network slice scheme.

The network slice is a method of virtualizing one physical network to generate several logical networks, and network slice instances (NSIs) may have different characteristics. Accordingly, every NSI may have a network function (NF) suitable for the characteristic and thus meet various service requirements. Various 5G services may be efficiently supported by allocating the NSI suitable for the service characteristic required for each UE.

Second, the 5GC may easily support a network virtualization paradigm through separation of a mobility management function and a session management function. In the conventional 4G LTE, all UEs may receive services over the network through a signaling exchange with a single core equipment that is a mobility management entity (MME) in charge of registration, authentication, mobility management, and session management functions. However, when the single equipment such as the MME supports all functions as the number of UEs explosively increases and mobility and traffic/session characteristics, which should be supported according to the UE type, are subdivided in the 5G, scalability for adding entities according to each of required functions cannot help being reduced. Accordingly, various functions are developed based on a structure of dividing a mobility management function and a session management function in order to improve a function/implementation complexity of a core equipment serving a control plane and expandability in the light of signaling load.

A conventional device-to-device (D2D) system provides a method by which a plurality of UEs outside the coverage of a base station communicate with each other through a relay UE. When the plurality of UEs communicate through the relay UE therebetween, a method of performing end-to-end protection (E2E protection) on data between the plurality of UEs is needed. The protection may mean integrity protection for guaranteeing integrity of a message and encryption/decryption for guaranteeing confidentiality of a message.

SUMMARY

The disclosure to solve the problem is to present a method and an apparatus for establishing the end-to-end security.

The technical subjects pursued in the disclosure may not be limited to the above-mentioned technical subjects, and other technical subjects which are not mentioned may be clearly understood, through the following descriptions, by those skilled in the art to which the disclosure pertains.

In accordance with an aspect of the disclosure, a method of a first terminal in a wireless communication system is provided. The method includes: transmitting a first request message for information required for establishing security between terminals to a first entity; receiving a first response message including the information required for establishing security between terminals from the first entity in response to the first request message; generating security information for the first terminal, based on the response message; transmitting a second request message including the security information for the first terminal to a relay terminal; establishing security with the relay terminal; receiving a second response message including security information for a second terminal from the relay terminal in response to the second request message; and generating an end-to-end session key (E2E session key) between terminals, based on the received security information for the second terminal.

In accordance with another aspect of the disclosure, a method of a relay terminal in a wireless communication is provided. The method includes: receiving a first request message including security information for a first terminal from the first terminal; transmitting a second request message to a second terminal, based on the first request message; establishing security with the second terminal; receiving a first response message including security information for the second terminal in response to the second request message; establishing security with the first terminal; and transmitting a second response message including security information for the second terminal to the first terminal in response to the first request message.

In accordance with another aspect of the disclosure, a first terminal includes: a transceiver; and a controller connected to the transceiver in a wireless communication system. The controller is configured to transmit a first request message for information required for establishing security between terminals to a first entity, receive a first response message including the information required for establishing security between terminals from the first entity in response to the first request message, generate security information for the first terminal, based on the response message, transmit a second request message including the security information for the first terminal to a relay terminal, establish security with the relay terminal, receive a second response message including security information for a second terminal from the relay terminal in response to the second request message, and generate an end-to-end session key (E2E session key) between terminals, based on the received security information for the second terminal.

In accordance with another aspect of the disclosure, a relay terminal in a wireless communication system includes: a transceiver; and a controller connected to the transceiver. The controller is configured to receive a first request message including security information for a first terminal from the first terminal, transmit a second request message to a second terminal, based on the first request message, establish security with the second terminal, receive a first response message including security information for the second terminal in response to the second request message, establish security with the first terminal, and transmit a second response message including security information for the second terminal to the first terminal in response to the first request message.

According to an embodiment of the disclosure, when two terminals communicate using a relay, E2E protection may be possible.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail in conjunction with the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of an eNode B (eNB), a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description of embodiments of the disclosure, LTE or LTE-A systems may be described by way of example, but the embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure.

Figure 1:
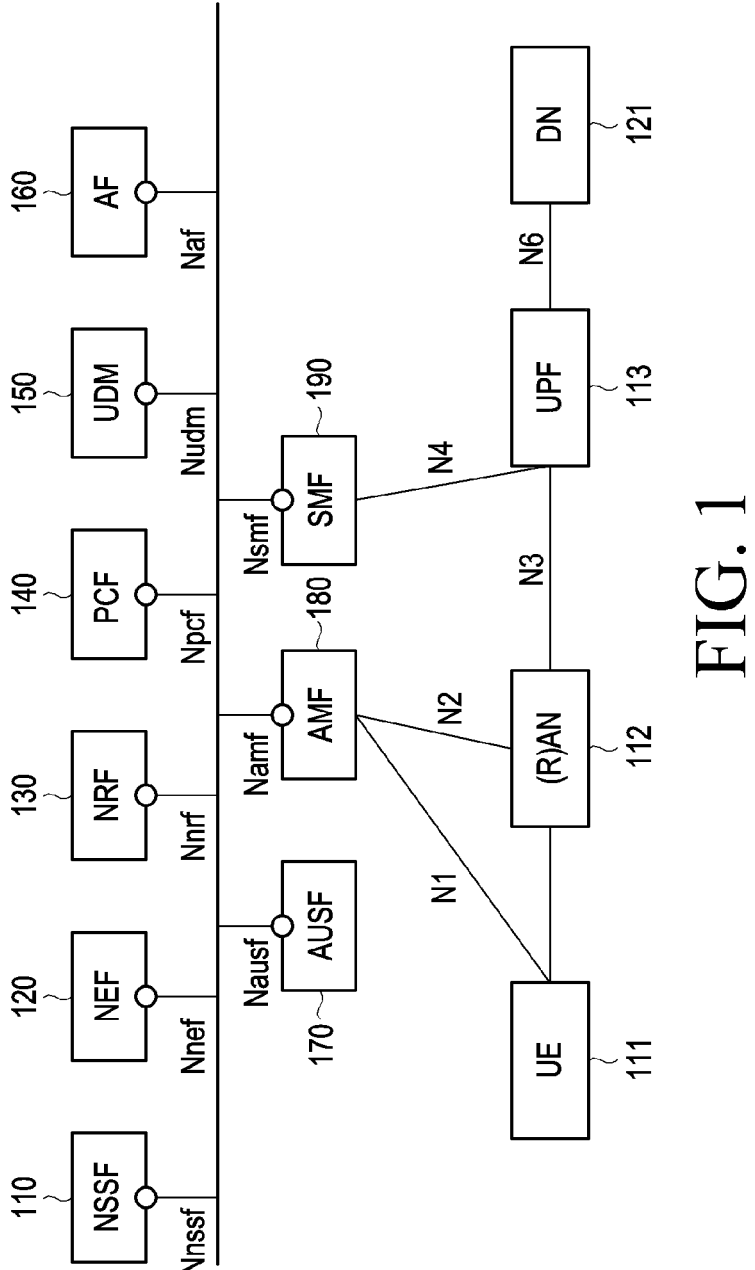
FIG. 1 illustrates a network architecture of a 5G system according to an embodiment of the present disclosure.

FIG. 1 illustrates a network architecture for a 5G system according to an embodiment of the present disclosure.

In the present disclosure, a network technology may be referred to by the standard (for example, TS 23.501, TS 23.502, TS 23.503, and the like) defined by the international telecommunication union (ITU) or the 3GPP, and elements included in the network architecture of FIG. 1 may be physical entities, software performing individual functions, or hardware combined with software. In FIG. 1, reference numeral Nx indicating N1, N2, N3, . . . denotes interfaces between NFs known in the 5G core network (CN), and a description related thereto may be referred to by the standard (TS 23.501), and thus a detailed description thereof is omitted. Hereinafter, in the description of FIG. 1, illustration/description of NFs which are not directly relevant to the disclosure is omitted.

The unit of each function provided by the 5G network system may be defined as a network function (NF). The architecture of the 5G mobile communication network is illustrated in FIG. 1.

Referring to FIG. 1, the 5G network system includes a new radio (NR) radio access node (NG-RAN) 112 for radio access of a user equipment (UE) 111, an access and mobility management function 180 for managing network access and mobility, a session management function (SMF) 190 for performing a function related to a session for the UE, a user plane function (UPF) 113 for transmitting user data and controlled by the SMF, an application function (AF) 160, a network exposure function (NEF) 120 supporting communication between the 5GC and the AF 160, a unified data management (UDM) 150 for data storage and management, a unified data repository (UDR) 160, a policy and control function (PCF) 140, and a data network (DN) 170 such as Internet through which user data is transmitted. There may be an authentication server function (AUSF) for performing user authority authentication and providing an authority authentication service to the UDM 150/AMF 180. In addition to the above-described NFs, operation, administration, and management (OAM) (not shown) which correspond to a system for managing the UE and the 5G mobile communication network may exist. Session information includes information on QoS information, charging information, and packet processing. The 5G network system may further include the RAN 112, a network slice selection function (NSSF) 110, and a network repository function (NRF) 130.

Figure 2:
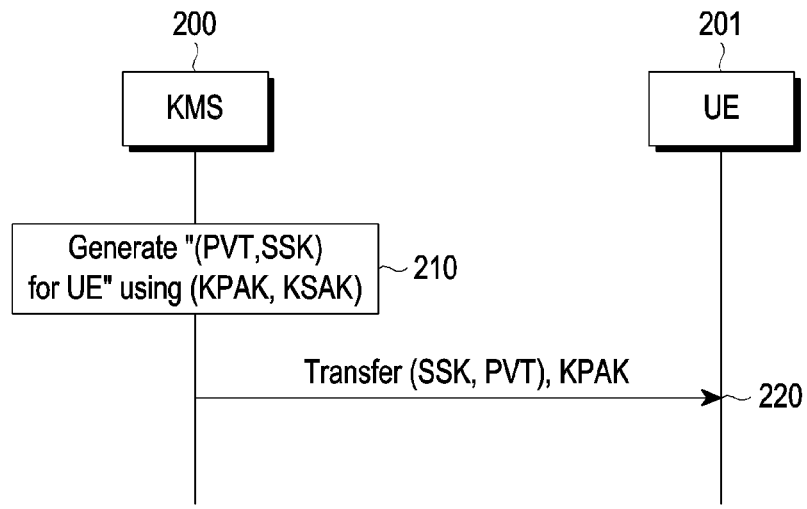
FIG. 2 illustrates an advance work process for a digital signature according to an embodiment of the present disclosure.

FIG. 2 illustrates an advance work process for a digital signature according to an embodiment of the present disclosure.

A UE 201 illustrated in FIG. 2 may be the same as some or all of the elements of the UE 111 illustrated in FIG. 1. According to various embodiments of the disclosure, a key management server (KMS) 200 may be included in one or more of NFs among the network functions (NFs) illustrated in FIG. 1. For example, the KMS may be the AUSF or a logical network function implemented within the AUSF illustrated in FIG. 1. According to an embodiment of the disclosure, the KMS is not one of the network functions illustrated in FIG. 1 and may be a new entity introduced for advance work for a digital signature. The new entity may cooperate with the network function illustrated in FIG. 1. According to an embodiment, the digital signature may include an identity-based digital signature scheme. Referring to FIG. 2, the KMS may perform at least one of the following processes in operation 210.

In one embodiment of Operation 1, according to an embodiment of the disclosure, the KMS 200 may have a pair of asymmetric keys (for example, including a public key). According to an embodiment of the disclosure, the pair of asymmetric keys may include a KMS secret authentication key (KSAK) and a KMS public authentication key (KPAK). According to an embodiment of the disclosure, the KSAK may be a secret key (or a private key) of the KMS 200. According to an embodiment of the disclosure, the KPAK may be a public key of the KMS 200. According to an embodiment of the disclosure, the KPAK and the KSAK may be a pair of an asymmetric key and a secret key generated using a random asymmetric key system. According to an embodiment of the disclosure, the random asymmetric key system may include an RSA or an elliptic curve cryptosystem. For example, the RSA is an asymmetric key system based on the number theory, particularly, difficulty in prime factorization, and the elliptic curve cryptosystem is an asymmetric key system based on algebraic geometry or elliptic geometry, particularly, difficulty in a discrete logarithm problem of an elliptic curve.

In one embodiment of Operation 2, according to an embodiment of the disclosure, the KMS 200 may generate a secret signing key (SSK) and a public validation token (PVT). According to an embodiment of the disclosure, the SSK may be used for a digital signature, the PVT may be used for digital signature verification, and the SSK and the PVT may be provided to the UE 201 and may have different values for respective UEs. According to an embodiment of the disclosure, the UE 201 may generate a digital signature of the UE 201 by using the SSK of the UE 201, and the signature may be verified using the PVT.

A process in which KMS 200 generates the PVT with the SSK may be various. For example, the KMS 200 may generate a pair of asymmetric keys (PVT, v). According to an embodiment of the disclosure, v may correspond to a secret key of the public key system, and the PVT may be a public key corresponding to v. According to an embodiment of the disclosure, the KMS 200 may generate the SSK by using at least one of KPAK, KSAK, v, PVT, and ID values of the UEs. According to various embodiments of the disclosure, the KMS 200 may add needed values as well as KPAK, KSAK, v, PVT, and ID values of the UEs to generate the SSK.

The KMS 200 may transmit at least one of the SSK corresponding to the secret key for the signature of the UE 201, the PVT for signature verification, and the KPAK of the KMS 200 to the UE 210.

Figure 3:
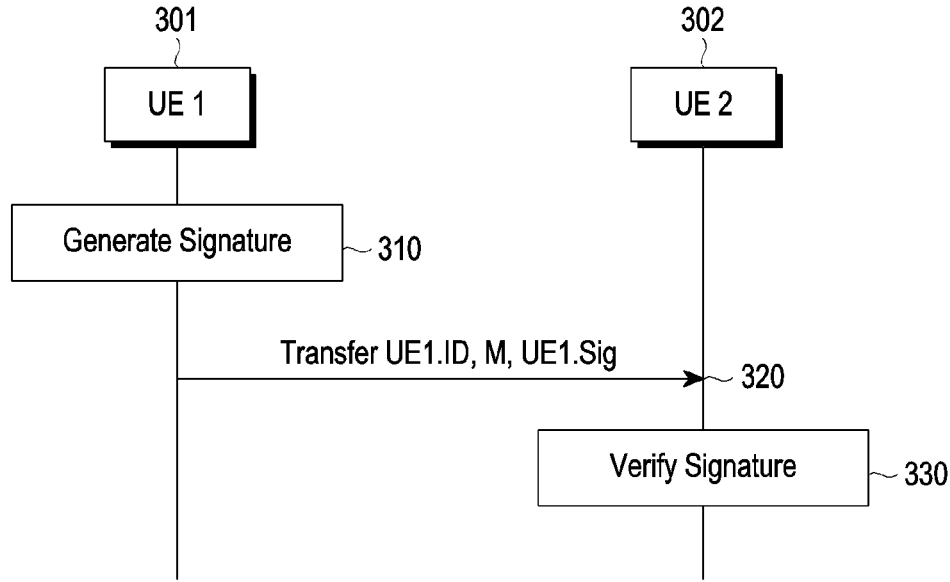
FIG. 3 illustrates a process in which a UE verifies a digital signature according to an embodiment of the present disclosure.

FIG. 3 illustrates a process in which the UE verifies a digital signature according to an embodiment of the present disclosure.

The UE1 and UE 2 illustrated in FIG. 3 may be the same as some or all of the elements of the UE 111 of FIG. 1.

The UE1 illustrated in FIG. 3 may have the following values through the process illustrated in FIG. 2:

KPAK of KMS; and

"security key SSK for signature" of UE and "token PVT" for signature verification" (hereinafter, referred to as UE1.SSK and UE1.PVT).

The UE2 illustrated in FIG. 3 may have the following value:

KPAK of KMS.

Referring to FIG. 3, UE1 301 may generate a digital signature for a message M in operation 310. A method by which the UE1 301 generates the digital signature may be various. For example, the UE 1 301 may select a random value r. The UE 1 301 may generate a new value s by using at least one of the value r, the message M, the UE_1.ID (ID of UE1), the KPAK, the UE_1.PVT, and the UE_1.SSK According to an embodiment of the disclosure, the UE_1 301 may generate the digital signature by adding other values as well as the value r, the message M, the UE_1.ID (ID of UE1), the KPAK, the UE_1.PVT, and the UE_1.SSK.

According to an embodiment of the disclosure, a combination of the generated values r and s may be defined as a "digital signature" value generated for the message M by the UE_1 301. A set of the generated "digital signature" value (for example, the combination of the values r and s) and the UE1.PVT (for example, a combination of r, s, and UE1.PVT) is a combination of the digital signature value generated by the UE_1 301 and a value for verifying the digital signature value and may be referred to as Sig. According to an embodiment of the disclosure, when the UE1.PVT has been already known to a counterpart to receive the digital signature, the UE1.PVT among the elements of Sig may be omitted, in which case Sig may be the same as the "digital signature" value defined above.

The UE1 301 may transmit at least one of the UE1 ID, the message M, and the UE1.Sig to the UE2 302 in operation 320. According to an embodiment of the disclosure, when the ID of UE1 301 (UE1.ID) has been already known through information transmitted to the UE2 302, the ID of UE1 301 may be omitted in operation 320.

The UE2 302 may verify the truth of the received digital signature values r and s in operation 330. According to an embodiment of the disclosure, the UE2 302 may verify whether digital signature values r and s received using at least one of the UE1.ID, the UE1.PVT, the KPAK, and the message M are digital signature values r and s correctly made for the received message M.

For example, a verification method may be performed through the following process:

1) the UE2 302 verifies whether the received PVT is a valid point on the given ellipse curve;

2) HS is derived by concatenating a generator of the ellipse curve, the KPAK, the ID of UE1 301, and the PVT and then applying a hash function;

3) HE is derived by concatenating HS, r, and M and applying a hash function;

4) A Y value is derived by performing scalar multiplication on an ellipse curve using the HS and the PVT and then adding the KPAK to the ellipse curve;

5) Scalar multiplication of the HE value and the generator is performed on an ellipse curve. Scalar multiplication of Y and r is performed on the ellipse curve. Addition of the two values to the ellipse curve is performed. A J value is derived through scalar multiplication of the value and a value s on the ellipse curve; and 6) x coordinates and y coordinates are derived on the basis of the J corresponding to a point in affine coordinates and then a modulo operation is applied to the x coordinate to identify whether x to which the modulo operation has been applied is the same as the value r.

According to an embodiment of the disclosure, the UE2 302 may add values other than the UE1.ID, the UE1.PVT, the KPAK, and the message M to use the same for digital signature verification.

Figure 4:
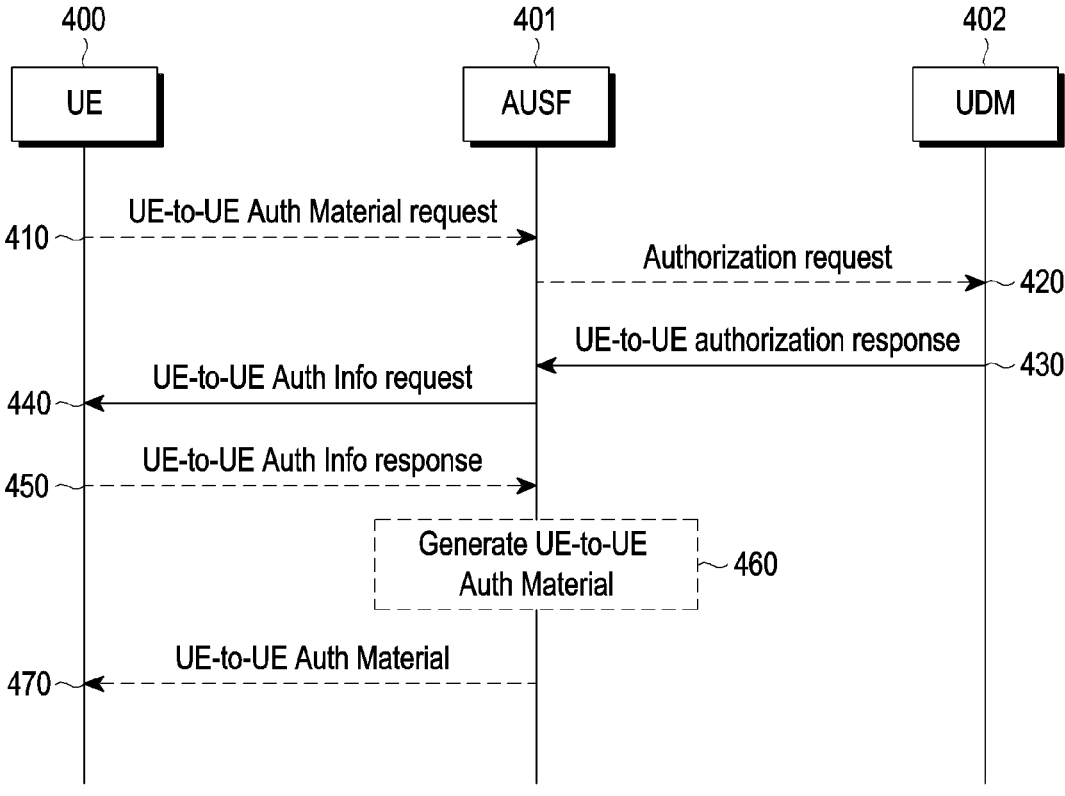
FIG. 4 illustrates a process of establishing end-to-end security when relaying UEs according to an embodiment of the present disclosure.

FIG. 4 illustrates a process of establishing end-to-end security when relaying UEs according to an embodiment of the present disclosure.

A UE 400, an AUSF 401, and a UDM 402 illustrated in FIG. 4 may be the same as some or all of the elements of the UE 111, the AUSF 170, and the UDM 150 illustrated in FIG. 1.

Referring to FIG. 4, the UE 400 may transmit a request message including "information required for establishing end-to-end security in the relay between UEs" to the AUSF 401 in operation 410. According to an embodiment of the disclosure, when "the information required for establishing end-to-end security in the relay between UEs" is provided to the UE 400 even though the UE 400 does not make the request, operation 410 may be omitted.

The AUSF 401 may transmit a message making a request for identifying whether the UE 400 has a right to use the relay between UEs to the UDM 402 managing subscription information of the UE 400 and whether it is required to establish end-to-end security between UEs when the UE 400 has the right to use the relay between UEs in operation 420.

When information on whether the UE 400 has the right to use the relay between UEs, whether it is required to establish end-to-end security between UEs when the UE 400 has the right to use the relay between UEs, and method(s) of establishing end-to-end security between UEs which can be used by the UE 400 is provided from the UDM 402 to the AUSF 401 even though there is no request from the AUSF 401 in particular, operation 420 may be omitted.

In response to the request message received by the AUSF 401, the UDM 402 may transmit a response message including at least one of information on whether the UE 400 has the right to use the relay between UEs, whether it is required to establish end-to-end security between UEs when the UE 400 has the right to use the relay between UEs, and method(s) of establishing end-to-end security between UEs which can be used by the UE 400 to the AUSF 401 in operation 430.

The information on whether the UE 400 has the right to use the relay between UEs, whether it is required to establish end-to-end security between UEs when the UE 400 has the right to use the relay between UEs, and method(s) of establishing end-to-end security between UEs which can be used by the UE 400 may be transmitted in various forms. For example, the information may be transmitted using parameter values or flag values referring to the information. According to an embodiment of the disclosure, the information may be referred to as a UE-to-UE indication.

The AUSF 401 transmits a message making a request for information required for generating "the information required for establishing end-to-end security in the relay between UEs" to the UE 400 in operation 440. The message may include the UE-to-UE indication which the AUSF 401 received from the UDM 402 in operation 430.

The UE 400 may determine whether to transmit the information required for generating "the information required for establishing end-to-end security in the relay between UEs" to the AUSF 401 on the basis of information included in the received request message. When it is determined that the UE 400 needs to transmit the information required for generating "the information required for establishing end-to-end security in the relay between UEs" to the AUSF 401, the UE 400 transmits the information required for generating "the information required for establishing end-to-end security in the relay between UEs" to the AUSF 401 in operation 450. According to an embodiment of the disclosure, the information required for generating "the information required for establishing end-to-end security in the relay between UEs" may be defined as "UE-to-UE Auth Info."

According to an embodiment of the present disclosure, the UE-to-UE Auth Info may be configured through various methods. According to an embodiment of the disclosure, the UE 400 may configure the UE-to-UE Auth Info by selecting at least one of the method(s) of establishing end-to-end security between UEs which can be used by the UE 400 included in the received UE-to-UE indication. The UE-to-UE indication may include information indicating the method(s) of establishing end-to-end security between UEs which can be used by the UE 400 (that is, supported by the network). The UE 400 may configure the UE-to-UE Auth Info according to the method(s) of establishing end-to-end security between UEs which can be used by the UE 400. For example, when the UE-to-UE indication includes information indicating the methods of establishing end-to-end security between UEs which can be used by a plurality of UEs 400, the UE-to-UE Auth Info may be configured to include information required for all of the methods of establishing end-to-end security between UEs which can be used by the plurality of UEs 400. For example, the methods of establishing end-to-end security between UEs may include two methods below.

First method: certificate-based approach.
1) According to an embodiment of the present disclosure, when a certificate-based approach is used, UE-to-UE Auth Info may include at least one of the following values:
   a) UE.ID (ID of UE);
   b) A UE.Cert (a certificate of the UE includes a public key of the UE (UE.PK)) when there is the UE.Cert (the certificate of the UE) issued by the AUSF 401; or
   c) A UE.PK when there is no UE.Cert (the certificate of the UE) issued by the AUSF 401.
2) According to an embodiment of the present disclosure, the UE.Cert may include at least one of the following information. For example, one or more of the following information may be included in a part of the UE.Cert or values corresponding to the following information may be included in a part of the UE.Cert.

a) An expiration date of the UE.Cert, for example, information indicating how long the UE.Cert is valid. According to an embodiment of the present disclosure, information related to the expiration date of the UE.Cert may be provided in various types. Some available examples are described below. However, a method of expressing the expiration date is not limited to the following method, and a random method of specifying the expiration date of the UE.Cert may be allowed:
     (a) The last time at which the UE.Cert is valid;
     (b) The start time at which the UE.Cert is valid and the time during which validity continues; and
     (c) The start time and the last time at which the UE.Cert is valid Second method: identity-based approach.
1) According to an embodiment of the disclosure, when an identity-based approach is used, UE-to-UE Auth Info may include a UE.ID (an ID of the UE).
2) According to an embodiment of the disclosure, the UE.ID may include at least one of the following information. For example, one or more of the following information may be included in a part of the UE.ID or values corresponding to the following information may be included in a part of the UE.ID.
   a) Expiration dates of the UE.SSK and the UE.PVT. For example, information indicating how long the UE.SSK and the UE.PVT are valid. According to an embodiment of the disclosure, information related to the expiration dates of the UE.SSK and the UE.PVT may be provided in various types. Some available examples are described below. However, a method of expressing the expiration date is not limited to the following method, and a random method of specifying the expiration dates of the UE.SSK and the UE.PVT may be allowed:
     (a) The last time at which the UE.SSK and the UE.PVT are valid;
     (b) The start time at which the UE.SSK and the UE.PVT are valid and the time during which validity continues; and
     (c) The start time and the last time at which the UE.SSK and the UE.PVT are valid.
   b) An ID of the UE used by the UE 400 for discovery and/or "determining whether to establish the connection" in the relay between UEs (for example, a layer-2 ID of the UE if one or more UEs discover a counterpart UE and/or "determine whether to establish the connection" by using the layer-2 ID of each other).

The AUSF 401 may determine whether to transmit "the information required for establishing end-to-end security in the relay between UEs" to the UE 400 on the basis of information included in the response message received in operation 450. When it is determined that the AUSF 401 needs to transmit "the information required for establishing end-to-end security in the relay between UEs" to the UE 400, the AUSF 401 may generate "the information required for establishing end-to-end security in the relay between UEs" in operation 460. According to an embodiment of the disclosure, "the information required for establishing end-to-end security in the relay between UEs" prepared to be transmitted from the AUSF 401 to the UE 400 may be defined as "UE-to-UE Auth Material". According to an embodiment of the disclosure, the UE-to-UE Auth Material may be configured in various methods. For example, two examples below may exist.

First method: certificate-based approach.

1) When a certificate-based approach is used, UE-to-UE Auth Material may include at least one of the following values:

a) UE.Cert (a certification of the UE); or b) Information for verifying the UE.Cert (for example, a root certification authority (CA) public key of a certificate chain and/or a root CA certificate and/or sub-CA(s) certificate(s) existing in the certificate chain) 2) According to an embodiment of the disclosure, the UE.Cert may include at least one of the following information. For example, one or more of the following information may be included in a part of the UE.Cert or values corresponding to the following information may be included in a part of the UE.Cert.

a) Expiration date of UE.Cert. For example, information indicating how long the UE.Cert expires According to an embodiment of the disclosure, information related to the expiration date of the UE.Cert may be provided in various types. Some available examples are described below. However, a method of expressing the expiration date is not limited to the following method, and a random method of specifying the expiration date of the UE.Cert may be allowed:

(a) The last time at which the UE.Cert is valid;

(b) The start time at which the UE.Cert is valid and the time during which validity continues; or (c) The start time and the last time at which the UE.Cert is valid Second method: identity-based approach.

1) Since the identity-based digital signature has been described in detail with reference to FIGS. 2 and 3 of the disclosure, a description thereof is omitted.

2) According to an embodiment of the disclosure, when the identity-based approach is used, UE-to-UE Auth Material may include at least one of the following values:

a) UE.ID (ID of UE);

b) UE.SSK;

c) UE.PVT; or d) KPAK.

3) According to an embodiment of the disclosure, the UE.ID may include at least one of the following information. For example, one or more of the following information may be included in a part of the UE.ID or values corresponding to the following information may be included in a part of the UE.ID.

a) Expiration dates of the UE.SSK and the UE.PVT. For example, information indicating how long the UE.SSK and the UE.PVT are valid. According to an embodiment of the disclosure, information related to the expiration dates of the UE.SSK and the UE.PVT may be provided in various types. Some available examples are described below. However, a method of expressing the expiration date is not limited to the following method, and a random method of specifying the expiration dates of the UE.SSK and the UE.PVT may be allowed:

(a) The last time at which the UE.SSK and the UE.PVT are valid;

(b) The start time at which the UE.SSK and the UE.PVT are valid and the time during which validity continues; or (c) The start time and the last time at which the UE.SSK and the UE.PVT are valid.

b) An ID of the UE used by the UE 400 for discovery and/or "determining whether to establish the connection" in the relay between UEs (for example, a layer-2 ID of the UE if one or more UEs discover a counterpart UE and/or "determine whether to establish the connection" by using the layer-2 ID of each other).

The AUSF 401 may transmit the "UE-to-UE Auth Material" generated in operation 460 in operation 470.

The embodiment of FIG. 4 may be applied to the case in which establishment of hop security between the UE and the relay is needed in the same way. At this time, the UE-to-UE indication may include information on whether it is required to establish hop security between the UE and the relay and on method(s) of establishing hop security between the UE and the relay which can be used by the UE 400. The UE 400 may configure UE-to-UE Auth Info through the same method as the embodiment of FIG. 4 for hop security between the UE and the relay. When is it determined that the AUSF 401 needs to transmit "information required for establishing hop security between the UE and the relay" to the UE 400, the AUSF 401 may generate a UE-to-UE Auth Material and transmit the UE-to-UE Auth Material to the UE 400 through the same method as the embodiment of FIG. 4. When establishment of both the end-to-end security between UEs and the hop security between the UE and the relay is needed, the same UE-to-UE Auth Material may be used.

For example, when the relay UE receives a request message for establishing security between the UE 400 and the relay UE including security information for the UE 400 from the UE 400 and the request message includes information indicating that the information required for establishing the security between the UE 400 and the relay UE is a certificate-based approach, the relay UE may transmit a message including a public key of the relay UE to the AUSF 401. When the request message includes information indicating that the information required for establishing the security between the UE 400 and the relay UE is an identity-based approach, the relay UE may transmit a message including information on an ID of the relay UE and an expiration date of the ID of the relay UE to the AUSF 401. When receiving the information on the ID of the relay UE and the expiration date of the ID of the relay UE, the AUSF 401 may newly generate a certificate for the relay UE or transmit a message including an indication indicating to use the existing certificate to the relay UE if the ID expires soon.

According to an embodiment of the disclosure, "the process in which the UE acquires information required for establishing end-to-end security when UE relays" illustrated in FIG. 4 may be independently performed, but may be performed while being inserted into a part of another process performed by the UE. For example, "the process in which the UE acquires information required for establishing end-to-end security when UE relays" may be performed as a part of a primary authentication process (for example, extensible authentication protocol-authentication and key agreement (EAP-AKA) or a 5G-authentication and key agreement (5G-AKA)) in which the UE 400 accesses the network to perform authentication. The example may be equally applied to "the process in which the UE acquires information required for establishing hop security between the UE and the relay," which is described in detail with reference to FIG. 5.

Figure 5:
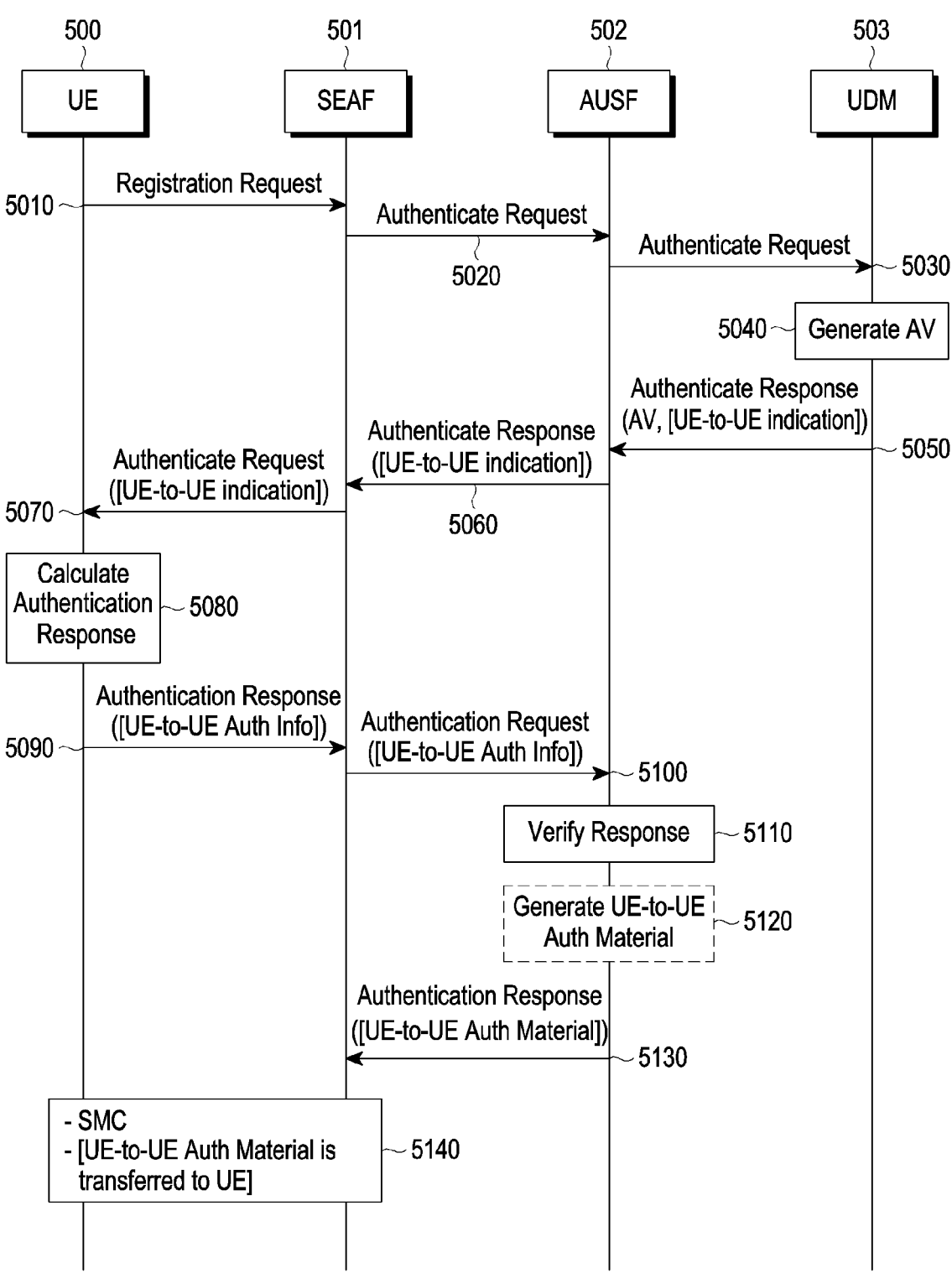
FIG. 5 illustrates an example of a process of establishing end-to-end security when relaying UEs according to an embodiment of the present disclosure.

FIG. 5 illustrates an example of a process of establishing end-to-end security when relaying UEs according to an embodiment of the present disclosure.

According to an embodiment of the disclosure, "a process in which the UE acquires information required for establishing end-to-end security in the relay between UEs" may be implemented as a portion of a primary authentication process performed for network access by a UE 500.

The UE 500, an AUSF 502, and a UDM 503 illustrated in FIG. 5 may be the same as some or all of the elements of the UE 111, the AUSF 170, and the UDM 150 illustrated in FIG. 1.

A security anchor function (SEAF) 501 illustrated in FIG. 5 is a logical function involved in network authentication by the UE 500 and may be implemented as one function of the NFs illustrated in FIG. 1. For example, the SEAF 501 illustrated in FIG. 5 may be implemented as one function of the AMF 180 illustrated in FIG. 1.

Referring to FIG. 5, the UE 500 may transmit a message making a request for authentication for network access to the SEAF 501 in operation 5010.

The SEAF 501 receiving the authentication request message from the UE 500 may transmit a message making a request for performing a procedure related to the authentication to the AUSF 502 in operation 5020.

The AUSF 502 may transmit a message making a request for documents related to the authentication to the UDM 503 in operation 5030.

The UDM 503 receiving the message making the request for documents related to the authentication from the AUSF 502 may perform one or more of the following processes in operation 5040.

In one embodiment of Process 1, according to an embodiment of the disclosure, the UDM 503 may identify subscription information of the UE 500 after identifying an identity of the UE 500. According to an embodiment of the disclosure, subscription information of the UE 500 may include at least one of the following information:

a) Information on whether the UE 500 is a customer of the corresponding service provider; or b) Information on a service type to which the UE 500 subscribes. Particularly, subscription information of the UE 500 related to the relay between UEs in the specification. According to an embodiment of the disclosure, the subscription information of the UE 500 related to the relay between UEs may include at least one of the information on whether the UE 500 has a right to use the relay between UE, whether it is required to establish end-to-end security between UEs when the UE 500 has the right to use the relay between UEs, and information on method(s) of establishing end-to-end security between UEs which can be used by the UE 400.

In one embodiment of Process 2, according to an embodiment of the disclosure, the UE 500 may generate information (for example, an authentication vector (AV)) required for authentication.

The UDM 503 may transmit a response message including information containing at least one of the AV generated in operation 5040 and UE-to-UE indication information according to the subscription information of the UE 500 identified in operation 5040 to the AUSF 502 in response to the request message received by the AUSF 502 in operation 5050. According to an embodiment of the disclosure, the UE-to-UE indication information may be the same as the UE-to-UE indication information described in FIG. 4.

The AUSF 502 may transmit the response message including the UE-to-UE indication received from the UDM 503 to the SEAF 501 in operation 5060.

The SEAF 501 may transmit the response message including the UE-to-UE indication received from the AUSF 502 to the UE 500 in operation 5070.

The UE 500 receiving the message making the request for documents related to the authentication from the SEAF 501 may perform one or more of the following processes in operation 5080.

In one embodiment of Process 1, according to an embodiment of the disclosure, the UE 500 may generate an authentication response in order to authenticate itself on the basis of the request message received from the SEAF 501.

In one embodiment of Process 2, according to an embodiment of the disclosure, the UE 500 may include UE-to-UE Auth Info in an authentication response to be transmitted to the AUSF 502 on the basis of the UE-to-UE indication information received from the SEAF 501. A description of the UE-to-UE Auth Info may be the same as the description of the UE-to-UE Auth Info in FIG. 4.

The UE 500 may transmit the authentication response including the UE-to-UE Auth Info to the SEAF 501 in operation 5090. The SEAF 501 may transmit the authentication response including the UE-to-UE Auth Info received from the UE 500 to the AUSF 502 in operation 5100.

The AUSF 502 may verify the authentication response received from the SEAF 501. According to an embodiment of the disclosure, via the verification process, the network may authenticate that the UE 500 is a legal user in operation 5110.

The AUSF 502 may determine whether to generate a UE-to-UE Auth Material to be transmitted to the UE 500 on the basis of the UE-to-UE indication received from the UDM 503 and the UE-to-UE Auth Info received from the SEAF 501 and generate the UE-to-UE Auth Material to be transmitted to the UE 500 according to the determination in operation 5120. A description of the UE-to-UE Auth Material may be the same as the description of the UE-to-UE Auth Material in FIG. 4.

When the UE-to-UE Auth Material is generated in operation 5120, the AUSF 502 may transmit a response message including the UE-to-UE Auth Material generated by the AUSF 502 to the SEAF 501 in operation 5130.

At least one of the key making work (referred to as a security mode command (SMC)) for security communication between the UE 500 and the SEAF 501 and transmission of the UE-to-UE Auth Material from the SEAF 501 to the UE 500 may be performed between the UE 500 and the SEAF 501 in operation 5140.

Figure 6:
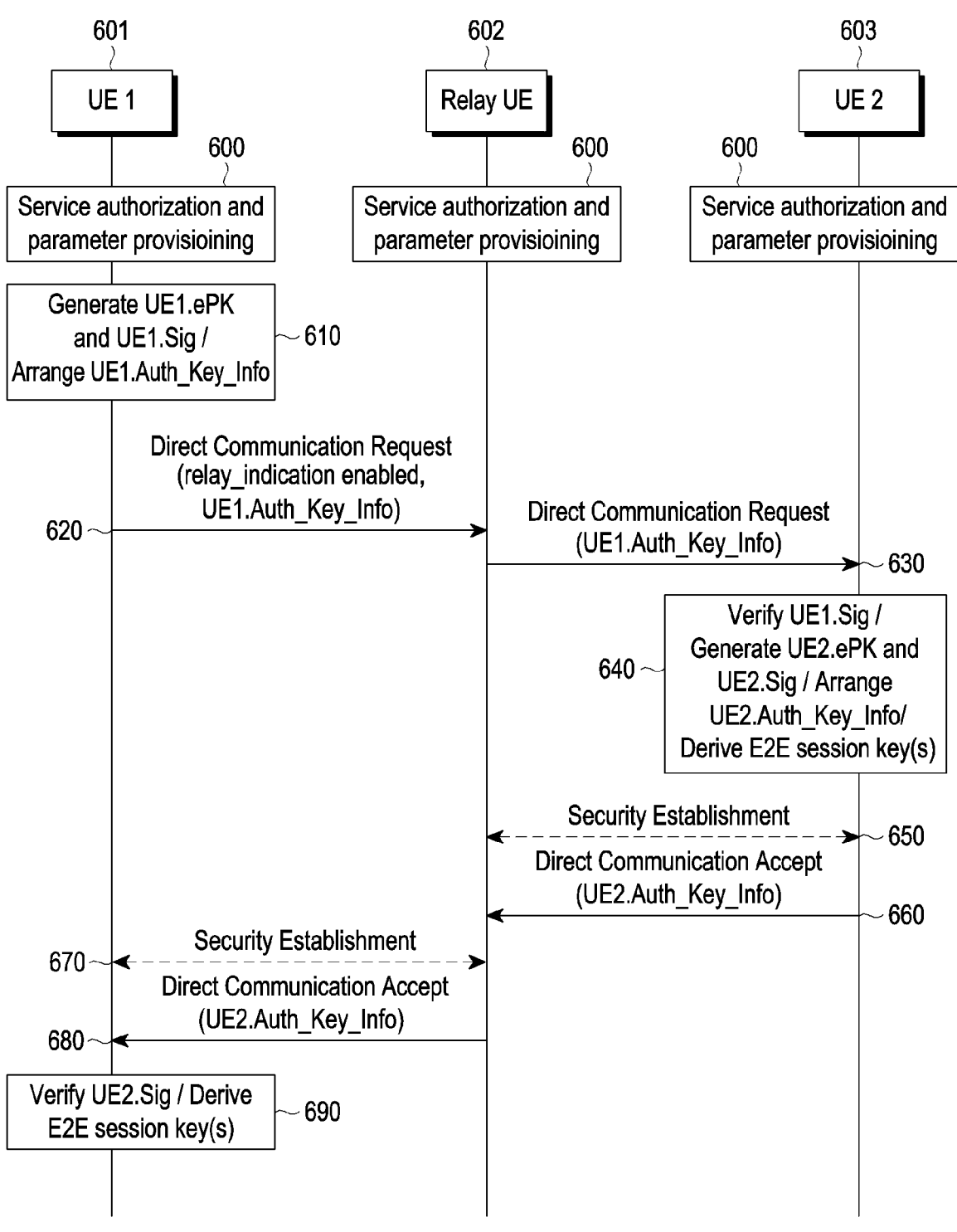
FIG. 6 illustrates a method of establishing end-to-end security when relaying UEs according to an embodiment of the present disclosure.

FIG. 6 illustrates a method of establishing end-to-end security when relaying UEs according to an embodiment of the present disclosure.

UE1 601 and UE2 603 illustrated in FIG. 6 may be the same as all of the elements of the UE 111 illustrated in FIG. 1. A relay UE 602 illustrated in FIG. 6 may be one of the UE 111 illustrated in FIG. 1 and/or the NFs illustrated in FIG. 1.

Referring to FIG. 6, when communicating via the relay UE 602, UE1 601 and UE2 603 may generate and share an end-to-end encryption key in order to establish end-to-end security.

The UE1 601 and UE2 603 performs "a process in which the UE acquires information required for establishing end-to-end security in the relay between UEs" described in FIGS. 4 to 5 in operation 600. According to an embodiment, the UE1 601 and UE2 603 may receive verification indicating whether to have a right to use the relay between UEs from the network in operation 600. According to an embodiment, the relay UE 602 may receive verification indicating whether to have a right to relay UEs in operation 600. According to an embodiment of the disclosure, in operation 600, the UE1 601 and UE2 603 may acquire UE-to-UE Auth Material, generate a digital signature for a message M on the basis of the acquired UE-to-UE Auth Material, and generate UE1. Sig and UE2.Sig including the generated digital signature and information for verifying the generated digital signature. According to an embodiment of the disclosure, a process of generating the UE1.Sig and the UE2.Sig may be implemented through the certificate-based approach or the identity-based approach. Since the certificate-based approach and the identity-approach have been described in detail with reference to FIG. 4, a description thereof is omitted.

The UE1 601 may generate a public key UE1.ePK and a secret key UE1.eSK and insert information for establishing security with the UE2 603 into UE1.Auth_Key_Info which is a generic container of the UE1 601 in operation 610. According to an embodiment of the disclosure, the UE1 601 may generate a digital signature on the basis of the UE1.ePK and generate a UE1.Sig including the generated digital signature. According to an embodiment of the disclosure, the UE1.ePK and the UE1.eSK may be a pair of a public key and a secret key used in a predetermined public key encryption system. According to an embodiment of the disclosure, UE1 601 may insert at least one of the UE1 ID, the UE1.ePK, and the UE1.Sig into the UE1.Auth_Key_Info. According to an embodiment of the disclosure, when UE1 601 generates the UE1.Sig on the basis of the certificate-based approach, the UE1.Auth_Key_Info may not include the UE1.ID.

The UE1 601 may transmit a message including the UE1.Auth_Key_Info to the relay UE 602 in operation 620.

The relay UE 602 may transmit the message including the UE1.Auth_Key_Info to UE2 603 on the basis of the message received in operation 620 in operation 630.

The UE2 603 may perform at least one of the following processes on the basis of the message received in the operation 630 in the operation 640.

In one embodiment of Process 1, the UE2 603 may verify validity of the digital signature transmitted by the UE1 601 on the basis of the UE1.Sig included in the UE1.Auth_Key_Info.

In one embodiment of Process 2, the UE2 603 may generate a public key UE2.ePK and a secret key UE2.eSK. According to an embodiment of the disclosure, the UE2.ePK and the UE2.eSK may be a pair of a public key and a secret key used in a predetermined public key encryption system.

In one embodiment of Process 3, the UE2 603 may generate the digital signature for the UE2.ePK.

In one embodiment of Process 4, the UE2 603 may generate the UE2.Sig including the digital signature.

In one embodiment of Process 5, the UE2 603 may insert information for establishing security with UE1 601 into UE2.Auth_Key_Info which is a generic container of UE2 603. According to an embodiment of the disclosure, the UE2 603 may include at least one of the UE2.ID, the UE2.ePK, and the UE2.Sig in the UE2.Auth_Key_Info. According to an embodiment of the disclosure, when UE2 603 generates the UE2.Sig on the basis of the certificate-based approach, the UE2.Auth_Key_Info may not include the UE2.ID.

In one embodiment of Process 6, the UE2 603 may generate a security key (for example, including an E2E session key) to be used for end-to-end security by using the UE1.ePK and the UE2.eSK.

Security between the relay UE 602 and UE2 603 may be established in operation 650. According to an embodiment of the disclosure, the security established in operation 650 may be used to protect communication performed between the relay UE 602 and UE2 603. According to an embodiment of the disclosure, security between the relay UE 602 and UE2 603 may be established in a hop-by-hop type The UE2 603 may transmit a message including the UE2.Auth_Key_Info to the relay UE 602 in operation 660.

Security between the relay UE 602 and UE1 601 may be established in operation 670. According to an embodiment of the disclosure, the security established in operation 670 may be used to protect communication performed between the relay UE 602 and UE1 601.

The relay UE 602 may transmit a message including the UE2.Auth_Key_Info to UE1 601 in operation 680.

The UE1 601 may perform at least one of the following processes in operation 690.

In one embodiment of Process 1, the UE1 601 may verify validity of the digital signature transmitted by the UE2 603 by using the UE2.Sig included in the UE2.Auth_Key_Info received in operation 680.

In one embodiment of Process 2, the UE1 601 may generate a security key (referred to as an E2E session key) to be used for end-to-end security by using the UE2.ePK and the UE1.eSK included in the UE2.Auth_Key_Info received in operation 680.

According to an embodiment of the disclosure, the UE1 601 and UE2 603 may generate and share the session key to be used for end-to-end security in operation 600 to 690. According to an embodiment of the disclosure, end-to-end security communication may be performed using the generated session key. According to an embodiment of the disclosure, the performed security communication may include at least one of the following security communication.

1) Integrity communication of a message transmitted from UEx to UEy (integrity protection). For example, integrity communication of the message may include communication through generation of a message authentication code (MAC).

2) Confidentiality communication of a message transmitted from UEx to UEy; For example, confidentiality communication of the message may include communication through an encryption/decryption process of the message.

An embodiment related to FIG. 6, may be similarly applied to the process of establishing hop security between the UE and the relay when it is required to establish hop security between the UE and the relay. The UE1 601 or UE2 603 may exchange a direct communication request message including Auth_Key_Info of respective UEs and the direct communication request message including Auth_Key_Info of the relay UE with the relay UE 602 to perform mutual authentication, and generate and share a session key to be used for hop-to-hop security. The UE1 601 or UE2 603 and the relay UE 602 may perform hop-to-hop security communication using the generated session key in operation 650 and operation 670. According to an embodiment, security information (that is, Auth_Key_Info) of the relay UE 602 may include at least one of an ID of the relay UE 602, a public key of the relay UE 602, and security information related to a digital signature of the relay UE 602. According to an embodiment, security information related to a digital signature of UE1 601, security information related to a digital signature of UE2 603, and security information related to a digital signature of the relay UE 602 may be configured as a combination of values for verifying the digital signature of UE1 601, the digital signature of UE2 603, and the digital signature of the relay UE 602.

Figure 7:
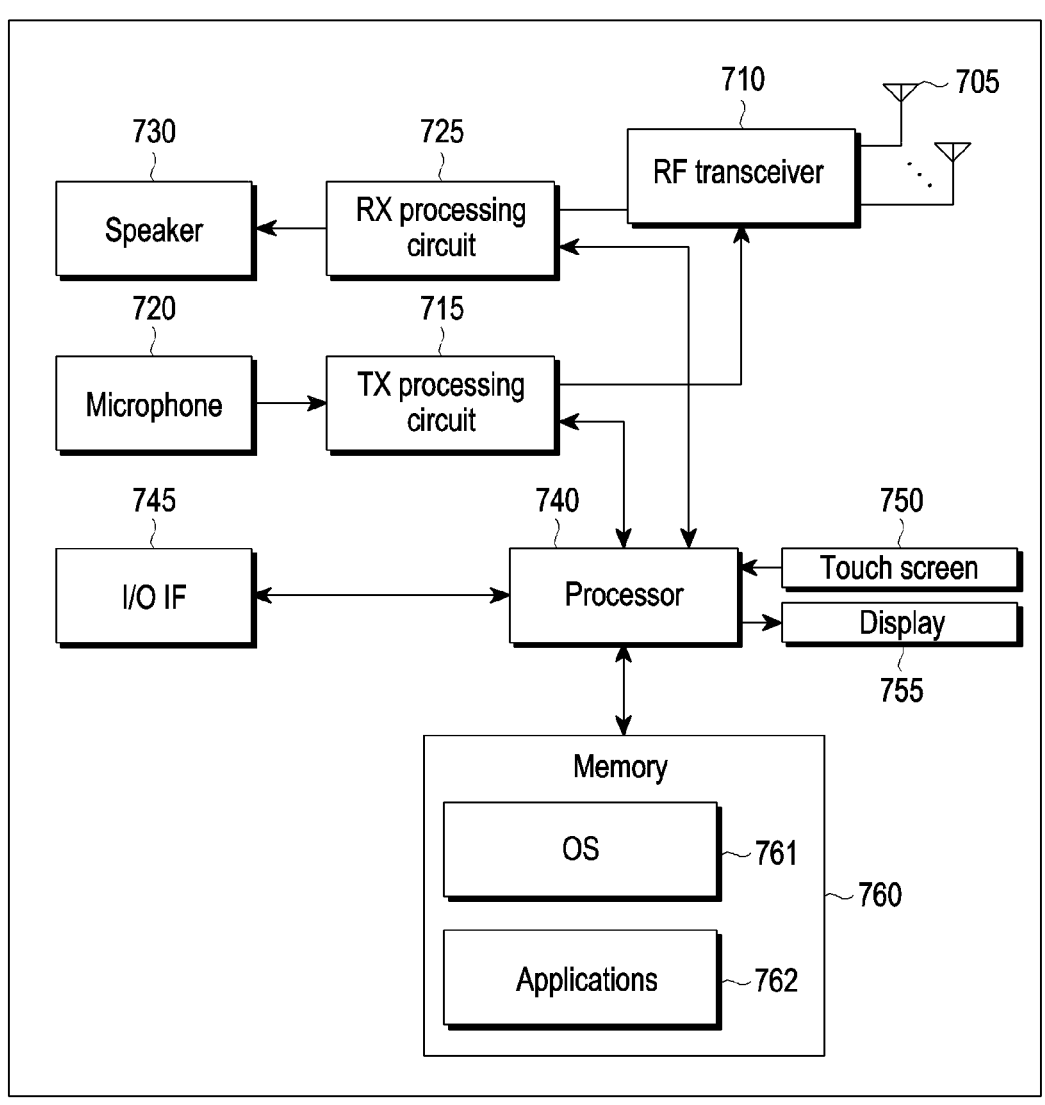
FIG. 7 illustrates a configuration of the UE according to an embodiment of the present disclosure.

FIG. 7 illustrates a configuration of the UE according to an embodiment of the present disclosure.

The embodiment of the UE illustrated in FIG. 7 is only an example and thus FIG. 7 does not limit the scope of the disclosure to specific implementation of the UE.

As illustrated in FIG. 7, the UE includes an antenna 705, a radio frequency (RF) transceiver 710, a TX processing circuit 150, a microphone 720, and a receive (RX) processing circuit 725. The UE also includes a speaker 730, a processor 740, an input/output (I/O) interface (IF) 745, a touch screen 750, a display 755, and a memory 760. The memory 760 includes an operating system (OS) 761 and one or more applications 762.

The RF transceiver 710 receives an input RF signal transmitted by a base station of the network from the antenna 705. The RF transceiver 710 down-converts the input RF signal to generate an intermediate frequency (IF) or baseband signal. The IF or baseband signal is transmitted to the RX processing circuit 725, and the RX processing circuit 725 generates a processed baseband signal by filtering, decoding, and/or digitalizing the baseband or IF signal. The RX processing circuit 725 transmits the processed baseband signal to the speaker 730 (for voice data) or the processor 740 (for web browsing data) for additional processing.

The TX processing circuit 715 receives analog or digital voice data from the microphone 720 or receive different output baseband data (such as web data, email, or interactive video game data) from the processor 740. The TX processing circuit 715 generates a processed baseband or IF signal by encoding, multiplexing, and/or digitalizing the output baseband data. The RF transceiver 710 receives the output processed baseband or IF signal from the TX processing circuit 715 and up-converts the baseband or IF signal into an RF signal transmitted through the antenna 705.

The processor 740 may include one or more processors or other processing devices and may execute the OS 761 stored in the memory 760 in order to control the overall operation of the UE. For example, the processor 740 may control reception of downlink channel signals and transmission of uplink channel signals by the RF transceiver 710, the RX processing circuit 725, and the TX processing circuit 715 according to the known principles. In some embodiments, the processor 740 includes at least one microprocessor or microcontroller.

In various embodiments of the disclosure, the processor 740 controls the overall operation related to the operation for the method of supporting selection of the UPF in the 5GC system. That is, the processor 740 controls, for example, the overall operation related to the operation for the method of establishing end-to-end security between UEs as described in FIGS. 1 to 6.

When data is required by the executed processor, the processor 740 may move the data to the memory 760 or from the memory 760. In some embodiments, the processor 740 is configured to execute the applications 762 on the basis of the OS program 761 or in response to signals received from base stations or an operator. Further, the processor 740 is connected to the I/O interface 745, and the I/O interface 745 provides connection capability for other devices such as laptop computers and handheld computers to the UE. The I/O interface 745 is a communication path between accessories and the processor 740.

The processor 740 is connected to the touch screen 750 and the display unit 755. The operator of the UE may input data into the UE through the touch screen 750. The display 755 may be a liquid crystal display, an organic light emitting diode display, or another display capable of at least rendering text and/or limited graphics from web sites.

The memory 760 is connected to the processor 740. A part of the memory 760 may include a random access memory (RAM), and the remaining parts of the memory 760 may include a flash memory or another read-only memory (ROM).

Although FIG. 7 illustrates an example of the UE, various modifications may be made for FIG. 7. For example, in FIG. 7, various components may be combined, may be additionally divided, or may be omitted, or other components may be added according to specific needs. Further, in a specific example, the processor 740 may be divided into a plurality of processors such as one or more central processing units (CPUs) and one or more graphics processing units (GPUs). Although the UE is a mobile phone or a smartphone in FIG. 7, the UE may be configured to operate as another type of mobile or fixed device.

Figure 8:
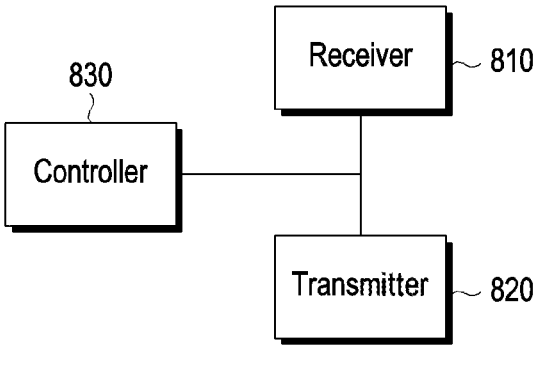
FIG. 8 illustrates a configuration of a network entity according to an embodiment of the present disclosure.

FIG. 8 illustrates a configuration of a network entity according to an embodiment of the present disclosure.

The network entity according to an embodiment of the disclosure is a concept including a network function according to a system implementation.

Referring to FIG. 8, a network entity 800 may include a transmitter 820, a receiver 810, and a controller 830 for controlling the overall operation of the network entity. Further, the network entity 800 may be implemented to include a communication interface and a processor for communication with other network entity(s) in a core network of the 5G system. In addition, the network entity 800 may be implemented to include a function of the network entity 800 in the server.

The controller 830 controls the overall operation of the network entity 800 and, particularly, controls establishment of end-to-end security between UEs. Since the operation in which the controller 830 controls the network entity 800 is the same as that described with reference to FIGS. 1 to 6, a detailed description thereof is omitted herein.

The receiver 810 receives various messages and information according to the control of the controller 830.

The transmitter 820 transmit various messages and information according to the control of the controller 830.

Although the receiver 810, the transmitter 820, and the controller 830 are implemented as separate units in FIG. 8, at least two of the receiver 810, the transmitter 820, and the controller 830 may be integrated into one. Further, the receiver 810, the transmitter 820, and the controller 830 may be implemented as at least one processor.

The network entity may be one of RAN, AMF, SMF, UPF, PCF, NF, NEF, NRF, NSSF, UDM, UDR, AF, DN, AUSF, SCP, UDSF, context storage, OAM, EMS, AAA-P, and AAA-H.

It should be noted that the diagrams illustrating the configuration, the diagrams illustrating the method of transmitting/receiving control/data signals, and the diagrams illustrating the operation procedure illustrated in FIGS. 1 to 8 have no intent to limit the scope of the disclosure. That is, it should not be construed that all element parts, entities, or operations shown in FIGS. 1 to 8 are essential elements for implementing the disclosure, and it should be understood that only a few elements may implement the disclosure within the scope without departing the subject matter of the disclosure.

The above-described operations of a base station or a terminal may be implemented by providing a memory device storing corresponding program codes in a base station or terminal device. That is, a controller of the base station or terminal device may perform the above-described operations by reading and executing the program codes stored in the memory device by means of a processor or central processing unit (CPU).

Various units or modules of an entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first terminal in a wireless communication system, the method comprising:
transmitting, to a first entity, a first request message for information required for establishing security between the first terminal and a second terminal;
in response to transmitting the first request message, receiving, from the first entity, a first response message including the information required for establishing the security between the first terminal and the second terminal;
generating, based on the first response message, first security information for the first terminal, wherein the first security information includes an identifier (ID) of the first terminal, a public key of the first terminal, and security information related to a digital signature of the first terminal;
transmitting, to a relay terminal, a second request message including the generated first security information for the first terminal;
establishing security with the relay terminal, after transmitting the second request message;
in response to transmitting the second request message, receiving, from the relay terminal, a second response message including second security information for a second terminal, after establishing the security with the relay terminal, wherein the second security information for the second terminal includes an ID of the second terminal, a public key of the second terminal, and security information related to a digital signature of the second terminal; and
generating an end-to-end session key (E2E session key) between the first terminal and the second terminal based on the received second security information for the second terminal.

2. The method of claim 1, wherein the security information related to the digital signature of the first terminal, the security information related to the digital signature of the second terminal, and the security information related to the digital signature of the relay terminal comprise a combination of values for verifying the digital signature of the first terminal, the digital signature of the second terminal, and the digital signature of the relay terminal.

3. The method of claim 1, further comprising:
transmitting, to the first entity, a message including a public key of the first terminal in case that information required for establishing the security between the first terminal and the second terminal included in a first message comprises information indicating a certificate-based approach; and
transmitting, to the first entity, a message including an ID of the first terminal and information on an expiration date of the ID of the first terminal in case that information required for establishing the security between the first terminal and the second terminal included in the first message comprises information indicating an identity-based approach.

4. The method of claim 3, wherein the first entity is configured to, in case that the message comprising the ID of the first terminal and the information on the expiration date of the ID of the first terminal is received and the expiration date is coming soon, newly generate a certificate for the first terminal or transmit, to the first terminal, a message comprising an indication of a conventional certificate.

5. A method of a relay terminal in a wireless communication system, the method comprising:
receiving, from a first terminal, a first request message including first security information for the first terminal, wherein the first security information includes an identifier (ID) of the first terminal, a public key of the first terminal, and security information related to a digital signature of the first terminal;
transmitting a second request message to a second terminal based on the received first request message;
establishing security with the second terminal, after transmitting the second request message;
in response to transmitting the second request message, receiving a first response message including second security information for the second terminal, wherein the second security information for the second terminal includes an ID of the second terminal, a public key of the second terminal, and security information related to a digital signature of the second terminal;
establishing security with the first terminal after receiving the first response message; and
in response to receiving the first request message, transmitting, to the first terminal, a second response message including the second security information for the second terminal, after establishing the security with the first terminal.

6. The method of claim 5, wherein the security information related to a digital signature of the first terminal, the security information related to the digital signature of the second terminal, and security information related to the digital signature of the relay terminal comprise a combination of values for verifying the digital signature of the first terminal, the digital signature of the second terminal, and the digital signature of the relay terminal.

7. The method of claim 5, further comprising, in case that information required for establishing hop security between the first terminal and the relay terminal included in the first request message includes information indicating a certificate-based approach, transmitting, to a first entity, a message including a public key of the relay terminal; and
In case that the information required for establishing hop security between the first terminal and the relay terminal included in the first request message includes information indicating an identity-based approach, transmitting, to the first entity, a message including information on an ID of the relay terminal and an expiration date of the ID of the relay terminal.

8. The method of claim 7, wherein, in case that the first entity receives the message including the information on the ID of the relay terminal and the expiration date of the ID of the relay terminal, the first entity is configured to newly generate a certificate for the relay terminal or transmit, to the relay terminal, a message including an indication indicating to use the certificate in case that the ID expires soon.

9. A first terminal in a wireless communication system, the first terminal comprising:

a transceiver; and a controller connected to the transceiver, the controller configured to:

transmit, to a first entity, a first request message for information required for establishing security between the first terminal and a second terminal, in response to transmitting the first request message, receive, from the first entity, a first response message including the information required for establishing the security between the first terminal and the second terminal, generate, based on the first response message, first security information for the first terminal, wherein the first security information includes an identifier (ID) of the first terminal, a public key of the first terminal, and security information related to a digital signature of the first terminal, transmit, to a relay terminal, a second request message including the generated first security information for the first terminal, establish security with the relay terminal, after transmitting the second request message, in response to transmitting the second request message, receive, from the relay terminal, a second response message including second security information for a second terminal, after establishing the security with the relay terminal, wherein the second security information for the second terminal includes n ID of the second terminal, a public key of the second terminal, and security information related to a digital signature of the second terminal, and generate an end-to-end session key (E2E session key) between the first terminal and the second terminal based on the received second security information for the second terminal.

10. The first terminal of claim 9, wherein the security information related to a digital signature of the first terminal, the security information related to the digital signature of the second terminal, and the security information related to the digital signature of the relay terminal comprise a combination of values for verifying the digital signature of the first terminal, the digital signature of the second terminal, and the digital signature of the relay terminal.

11. The first terminal of claim 9, wherein the controller is further configured to:

transmit, to the first entity, a message including a public key of the first terminal in case that information required for establishing the security between the first terminal and the second terminal included in a first message comprises information indicating a certificate-based approach, and transmit, to the first entity, a message including an ID of the first terminal and information on an expiration date of the ID of the first terminal in case that information required for establishing the security between the first terminal and the second terminal included in the first message comprises information indicating an identity-based approach.

12. The first terminal of claim 11, wherein the first entity is configured to, in case that the message comprising the ID of the first terminal and the information on the expiration date of the ID of the first terminal is received and the expiration date is coming soon, newly generate a certificate for the first terminal or transmit, to the first terminal, a message comprising an indication of a conventional certificate.

13. A relay terminal in a wireless communication system, the relay terminal comprising:

a transceiver; and a controller connected to the transceiver, the controller configured to:

receive, from a first terminal, a first request message including first security information for the first terminal, wherein the first security information includes an identifier (ID) of the first terminal, a public key of the first terminal, and security information related to a digital signature of the first terminal, transmit a second request message to a second terminal based on the received first request message, establish security with the second terminal, after transmitting the second request message, in response to transmitting the second request message, receive a first response message including second security information for the second terminal, wherein the second security information for the second terminal includes an ID of the second terminal, a public key of the second terminal, and security information related to a digital signature of the second terminal, establish security with the first terminal, after receiving the first response message, and in response to receiving the first request message transmit, to the first terminal, a second response message including the second security information for the second terminal, after establishing the security with the first terminal.

14. The relay terminal of claim 13, wherein the security information related to a digital signature of the first terminal, the security information related to the digital signature of the second terminal, and the security information related to the digital signature of the relay terminal comprise a combination of value for verifying the digital signature of the first terminal, the digital signature of the second terminal, and the digital signature of the relay terminal.

15. The relay terminal of claim 13, wherein the controller is configured to:

in case that information required for establishing hop security between the first terminal and the relay terminal included in the first request message includes information indicating a certificate-based approach, transmit, to a first entity, a message including a public key of the relay terminal; and in case that the information required for establishing hop security between the first terminal and the relay terminal included in the first request message includes information indicating an identity-based approach, transmit, to the first entity, a message including information on an ID of the relay terminal and an expiration date of the ID of the relay terminal.

16. The relay terminal of claim 15, wherein, in case that the first entity receives the message including the information on the ID of the relay terminal and the expiration date of the ID of the relay terminal, the first entity is configured to newly generate a certificate for the relay terminal or transmit, to the relay terminal, a message including an indication indicating to use the certificate in case that the ID expires soon.

\* \* \* \* \*